Jan. 20, 1970     H. D. BOULTINGHOUSE     3,490,664
RECIPROCATING PLASTIC FILM SPLITTER
Filed Dec. 6, 1965

INVENTOR
H. D. BOULTINGHOUSE
BY
ATTORNEYS

United States Patent Office 3,490,664
Patented Jan. 20, 1970

3,490,664
RECIPROCATING PLASTIC FILM SPLITTER
Harold D. Boultinghouse, Bartlesville, Okla., assignor to Phillips Petroleum Company, a corporation of Delaware
Filed Dec. 6, 1965, Ser. No. 511,643
Int. Cl. B26f *3/00, 1/02*
U.S. Cl. 225—97                                 2 Claims

ABSTRACT OF THE DISCLOSURE

Fibrillatable film is pierce split using piercing means reciprocably mounted opposite an elastomeric support.

---

This invention relates to apparatus for fibrillating oriented plastic film.

Heretofore, oriented plastic film has been fibrillated by pierce splitting same, i.e. puncturing with needle-like means without substantial lateral movement of the puncturing means; however, it has been difficult to obtain high speed pierce splitting without at least partially shredding the film, i.e. lateral movement of the puncturing means.

It has now been found that quite high speed pierce splitting of oriented plastic film is obtained with a minimum of shredding when the piercing means is reciprocably mounted opposite an elastomeric support member and means is provided for rapidly reciprocating the piercing means toward and away from the elastomeric support means in a manner to cause piercing of the film as it passes between said piercing means and said support member.

Accordingly, it is an object of this invention to provide a new and improved apparatus for fibrillating film.

Other aspects, objects, and the several advantages of this invention will be apparent to those skilled in the art from the description, drawings, and appended claims.

Figure 1:
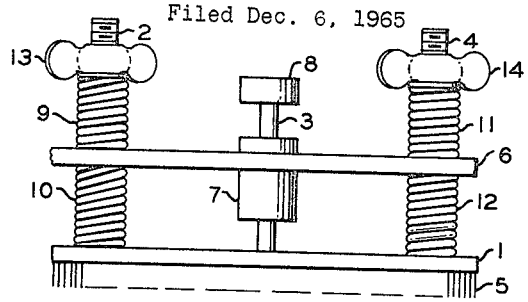

In FIGURE 1 there is shown a reciprocable piercing means according to this invention.

Figure 2:
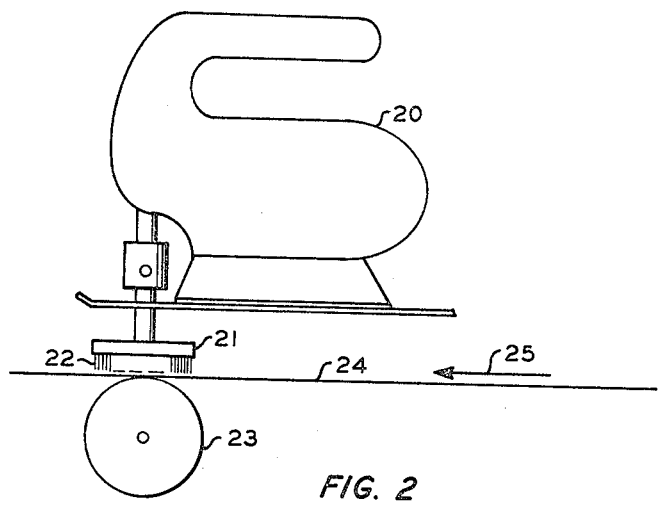

In FIGURE 2 there is shown a system embodying this invention.

Figure 3:
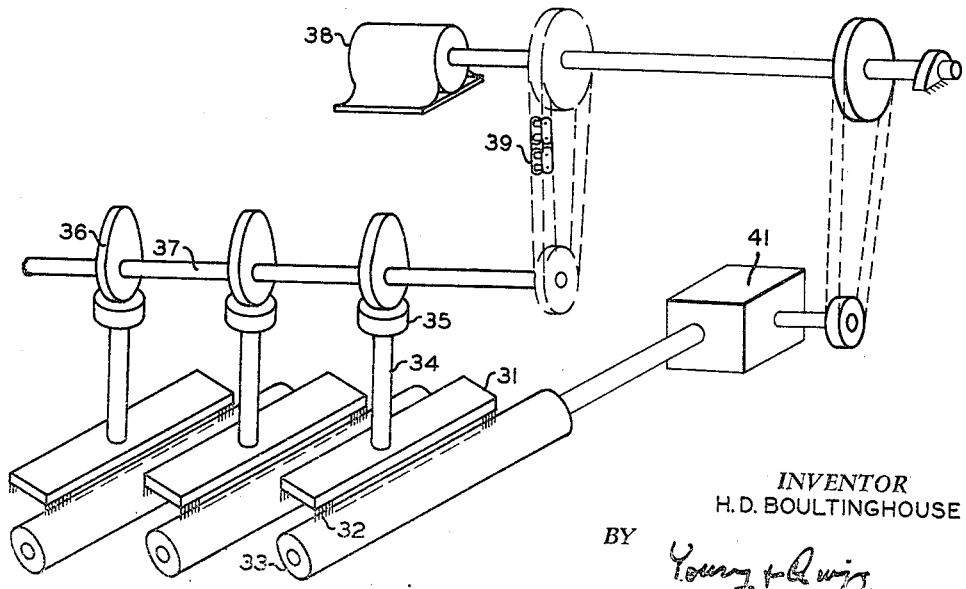

In FIGURE 3 there is shown another system embodying this invention.

In FIGURE 1 there is shown a support means comprising a plate 1 carrying shafts 2, 3, and 4 on one side thereof and a plurality of needles 5 on the opposite side. Shafts 2–4 are reciprocably fit through stationary bar 6. Rubber washer 7 is provided on shaft 3 to serve as a movement limiting member for plate 1 and head 8. Plate 1 is made to automatically return to its normal position by positioning springs 9–12 on opposite sides of bar 6. The springs are held in position by wing nuts 13 and 14. Upon movement of plate 1 away from bar 6, by a force acting on head 8, needles 5 can be made to pierce a film, and upon removal of the force plate 1 will, by springs 9 and 11, automatically return to its normal position spaced away from the film. Head 8 can be depressed by a force such as from a cam, arm, and the like.

FIGURE 2 shows a particularly flexible embodiment of this invention employing an electric portable saw or other reciprocating means 20 adapted to carry and reciprocate a plate 21 which carries needles 22. Needles 22 can be positioned opposite rubber roller 23 by hand and film 24 passing over roller 23 in the direction of arrow 25 can be fibrillated to any desired extent at will since means 20 can be moved in any manner to produce the desired fibrillation at any desired time and can be turned on and off on short notice.

FIGURE 3 shows a plurality of plates 31 each supporting a plurality of needles 32 opposite a plurality of rubber rollers 33. Each plate 31 is supported by conventional means not shown except for shaft 34 and cam follower 35. A plurality of cams 36 are provided on shaft 37 to coact with cam followers 35 and thereby reciprocate needles 31 toward and away from rollers 33. Shaft 37 is rotated by motor 38 thru chain drive 39. Roller 33 is rotated by motor 38 through gear means 41 for coordinating the rate of reciprocation of needles 32 and the rate at which the film is drawn past needles 32.

It should be noted that any rubber or other resilient support means known in the art can be substituted for roller 33 such as a continuous rubber belt supported on conventional steel rollers.

The degree of fibrillation of the film can be controlled and varied to any extent desired by coordinating the rate of reciprocation of needles 32 and the rate at which the film is drawn past needles 32. This coordination can be carried out by any conventional means such as by manually controlling the speed of the drive motors which are used to reciprocate the needles 32 and draw the film therepast, or by employing a single drive motor from which both the needles are reciprocated and the film is drawn, the needle reciprocation and film drawing mechanisms each being connected to the single drive motor through separate, adjustable gear means.

Generally, any orientable plastic film can be employed in this process. The film can be in a uniaxially, biaxially, or other multi-axially oriented condition. The film can be oriented in any conventional manner including supercooling the film and then orienting same by stretching and the like, or heating the film to a temperature below that at which the film is in the molten state and then stretching same. By orientation, what is generally meant to be covered is deforming, e.g., stretching, the film below that temperature at which the film is substantially in the molten state, to thereby increase the strength of the film at least in the direction in which it is deformed.

Generally, films of 1-olefins having from 2 to 8 carbon atoms per molecule which have been oriented by stretching in at least one direction so that the film after stretching is at least 3 times longer in the direction of stretching that it was before stretching, i.e., 3 to 1, can be used. When film of polyethylene which has a density of at least about 0.94 gram per cubic centimeter at 25° C. is employed the ratio of length in the stretched direction to original length should be at least 4 to 1 and when polypropylene is employed this ratio should be at least 6 to 1. Polymers of 1-olefins can be made in any conventional manner. A particularly suitable method is that disclosed in U.S. Patent 2,853,741. The film can be made from the polymers in any conventional manner such as by extrusion, casting, flattening blown tubing, and the like.

Other conventional plastic films that can be employed in this invention include blends and copolymers of 1-olefins as above-described with each other and with other polymers such as polyamides, polyesters, polyvinyl alcohol, acrylic polymers, polyvinyl chloride, polyvinyl acetate, polyvinylidene chloride, and the like. Of course, homopolymers of the 1-olefins and other monomers described can also be employed. A stretch or orientation ratio of at least 3 to 1 can also be employed with these films.

The film can be of any length and width and substantially any thickness, the minimum thickness of the film being that which will produce a substantially self-sustaining film and the maximum thickness being dictated by the piercing capability of the piercing means employed. Preferably, the thickness of the film will vary from that which is sufficient to form a self-sustaining film to 6 mils. Thicker films can be treated by using heavier duty piercing apparatus or by passing the same film through the same piercing apparatus two or more times. By repeated passes through the same piercing apparatus lighter duty piercing means can be employed to effectively fibrillate thicker and/or tougher films than can be accommodated on a single pass. Also, the piercing apparatus can be used to partially pierce the film to facilitate subsequent fibrillation thereof.

EXAMPLE

A 2 mil thick film of a homopolymer of polyethylene having a density at 25° C. of 0.96 gram per cubic centimeter and a melt index of 0.2 was oriented longitudinally by stretching the film approximately 700 percent at a temperature of about 240° F.

The film was the passed over a rubber roller and fibrillated by reciprocating needles supported on a needle plate such as shown in FIGURE 1, the plate being reciprocated through a 1 inch stroke at 2300 strokes per minute by a conventional sabre saw.

A uniformly fibrillated product composed of a series of substantially parallel but spaced apart stem fibers each integrally interlocked along its length, with smaller length and diameter, spaced apart cross fibers split from the stem fibers, was formed.

Reasonable variations and modifications are possible within the scope of this disclosure without departing from the spirit and scope thereof.

I claim:

1. In apparatus for fibrillating oriented plastic film the combination of a plurality of reciprocably mounted support means each having a plurality of piercing means on at least one end thereof, said support means being aligned with one another so that a film passing through said apparatus passes by the piercing means on each support means, means for reciprocating said support means without substantial lateral movement thereof, an elastomeric support member spaced from and opposite said piercing means so that reciprocation of said support means will cause piercing of said film passing between said piercing means and said elastomeric support member, and means for controlling the rate of reciprocation of said support means and the velocity of the plastic film passing between said piercing means and said elastomeric support member so that the piercing means does not shred the plastic film but only pierces same.

2. The apparatus according to claim 1 wherein said piercing means are a plurality of needles and said elastomeric support member is a rubber roller.

References Cited

UNITED STATES PATENTS

| | | | |
|---|---|---|---|
| 1,931,979 | 10/1933 | Chandler | 83—660 |
| 2,142,728 | 1/1939 | Kienzle | 83—660 |
| 3,302,501 | 2/1967 | Greene | 83—2 |

WILLIAM S. LAWSON, Primary Examiner

U.S. Cl. X.R.

83—2, 175, 355, 357, 660; 225—3

Disclaimer and Dedication 3,490,664.—*Harold D. Boultinghouse*, Bartlesville, Okla. RECIPROCATING PLASTIC FILM SPLITTER. Patent dated Jan. 20, 1970. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]